(12) United States Patent
Chang (10) Patent No.: US 9,804,695 B2
(45) Date of Patent: Oct. 31, 2017

(54) CURSOR CONTROL APPARATUS AND METHOD FOR THE SAME

(71) Applicant: Yun-Shan Chang, San Jose, CA (US)

(72) Inventor: Yun-Shan Chang, San Jose, CA (US)

(73) Assignees: Yun-Shan Chang, San Jose, CA (US); Dai-Wei Lin, New Taipei (TW)

( * ) Notice: Subject to any disclaimer, the term of this patent is extended or adjusted under 35 U.S.C. 154(b) by 0 days.

(21) Appl. No.: 14/149,921

(22) Filed: Jan. 8, 2014

(65) Prior Publication Data

US 2015/0193016 A1    Jul. 9, 2015

(51) Int. Cl.
*G06F 3/038*    (2013.01)
*G06F 3/0354*    (2013.01)
*G06F 3/03*    (2006.01)

(52) U.S. Cl.
CPC .......... *G06F 3/0383* (2013.01); *G06F 3/0317* (2013.01); *G06F 3/0354* (2013.01)

(58) Field of Classification Search
CPC .... G06F 3/038; G06F 3/0338; G06F 3/03543; G06F 1/169; G06F 3/0362; G06F 3/0317; G06F 3/0304; G06F 3/0383; G06F 3/0421; G06F 3/0412; G06F 3/042; G06F 3/03545; G06F 2203/0333
See application file for complete search history.

(56) References Cited

U.S. PATENT DOCUMENTS

| | | | | |
|---|---|---|---|---|
| 6,160,901 | A * | 12/2000 | Kage | 382/107 |
| 8,144,931 | B1 * | 3/2012 | Hartman et al. | 382/103 |
| 2005/0024335 | A1 * | 2/2005 | Wang | 345/166 |
| 2005/0104089 | A1 * | 5/2005 | Engelmann et al. | 257/204 |
| 2008/0158158 | A1 * | 7/2008 | Cheah et al. | 345/166 |
| 2008/0165263 | A1 * | 7/2008 | Hsu | 348/281 |
| 2009/0179656 | A1 * | 7/2009 | Mueller et al. | 324/751 |
| 2011/0267384 | A1 * | 11/2011 | Fujiwara et al. | 345/690 |
| 2013/0241835 | A1 * | 9/2013 | Lee | 345/166 |

* cited by examiner

*Primary Examiner* — Md Saiful A Siddiqui
(74) *Attorney, Agent, or Firm* — Rosenberg, Klein & Lee (57) ABSTRACT

Disclosure is related to a cursor control apparatus and a method for controlling the cursor. The cursor control apparatus essentially includes a light-emitting unit for emitting lights, a housing having a light passage thereon, a light-sensing unit and a control unit. The lights are emitted to outside the apparatus via the light passage. The light-sensing unit then receives the reflected lights from a surface via the passage, especially the lights reach a plurality of sensing cells arranged in an array. The control unit is used to control the energy of the emitting lights, and control the light-sensing unit to receive the lights. After that, the energy received by every sensing cell in an interval can be computed and find the spatial interference difference of energy. The difference is made to determine a moving direction, for example the cursor's movement with the movement of user's finger around the light passage.

15 Claims, 9 Drawing Sheets

CURSOR CONTROL APPARATUS AND METHOD FOR THE SAME

BACKGROUND

1. Technical Field

The present invention is generally related to a cursor control apparatus and a method for controlling, in particular to the cursor control apparatus having an optical sensor component composed of a plurality of sensor cells arranged in an array, and the control method for the same.

2. Description of Related Art

The conventional optical sensor is the sensing component such as Complementary metal-oxide-semiconductor (CMOS), or Charge-coupled Device (CCD) that converts the received light signals into electric signals. A certain optical intensity (energy) may be captured by these sensors in general. By this scheme, in addition to capturing images, a distance sensor may be implemented for the sensor is able to determine the distance from a light source. The sensor is also used to calculate the energy change with time.

An optical indexer is such as a computer mouse that is used to determine a moving track by the inside optical sensor. While a light emitted to an operative surface, a moving vector may be determined by the sensor to collect the energy change within a time interval and to perform image processing. The conventional optical computer mouse is referred to FIG. 1 that depicts inner circuits. This optical mouse 10 moves over a surface 11. Within its device housing 12, the inner circuits include a circuit board 14 in addition to the essential optics elements. Further, a controller 18 used to control, sense and operate light emission, and a light source 16 and a sensor 19 are disposed on the circuit board 14.

Figure 1:
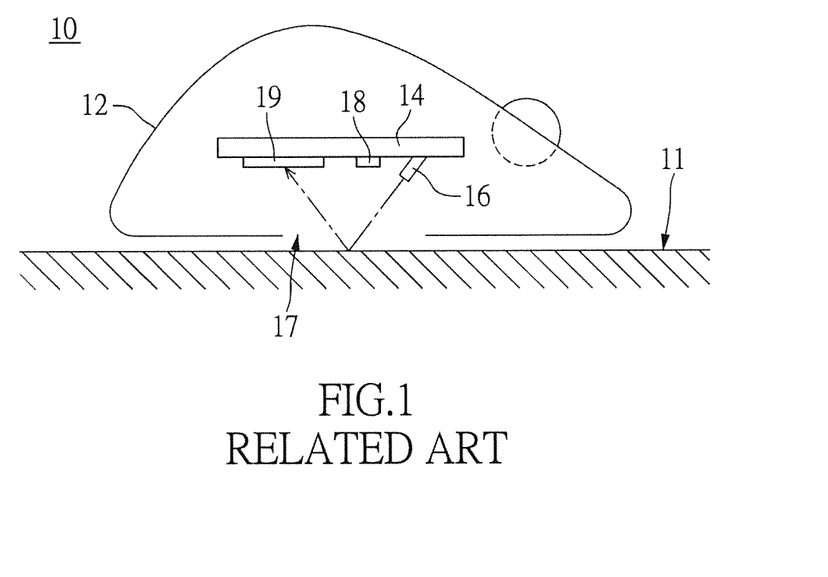
FIG. 1 shows the inner circuits of the conventional optical mouse.

According to the present example of the optical mouse 10, an aperture 17 directed to external surface 11 is formed on its housing 12. The circuit board 14 is disposed near the aperture 17. A light source 16 such as a laser die or LED is disposed onto the circuit board 14. The light source 16 continuously emits lights to the surface 11 with a specific angle while the optical mouse 10 operates. The shown broken line represents the path of the incident light. A sensor 19 receives reflected light from the surface 11. The sensor 19, such as a CMOS or CCD image sensor, may obtain a distribution diagram made by the reflected light. The controller 18 then obtains a moving direction of the optical mouse 10 by analyzing the energy distribution.

In the conventional technology that determines the moving track of the optical mouse 10, the surface 11 may dominate the performance of tracking the optical mouse 10 since the signals of reflected light made by the surface 11 is the essential information.

For example, the conventional optical mouse 10 may not normally operate when it moves over a transparent material or the surface (11) that hard to reflect the light. Further, the optical mouse 10 may not easily work when it moves over an undulate non-planar surface 11, for example the cloth with wrinkles.

For the purpose of light tracing, the conventional technology may not function well when the optical indexer moves over a transparent surface or the surface that not easily reflects the light. These types of surfaces may cause the failure to determine the movement.

In the conventional technologies, some of them use additional positioning measures to acquire the moving tracks, or some use additional complicated algorithm to maintain a certain ability of tracing the movement. However, theses positioning measures or algorithm may be limited to some types of surfaces because of the limitations of sensitivity, high energy consumption, and complexity. However, these technologies are not applicable to or achieve light tracing over every surface with too high or too low reflectivity.

SUMMARY

In view of the conventional device such the optical computer mouse adopting the optical sensor may not function well over all the surfaces with too high or low reflectivity, provided in the disclosure is related to a cursor control apparatus with an optical sensor array, and a control method for the same. The cursor control apparatus includes a plurality of sensor cells arranged in an array. The array-formed sensor cells operate with a corresponding tracing algorithm implement the light tracing method.

The application allows the cursor control apparatus in accordance with the present invention to implement great tracing capability, for example applied to the optical computer mouse, without too much complex optical sets. In particular, the apparatus incorporates a light source such as Laser that is with great spatial coherence. The related method for controlling the cursor by the cursor control apparatus is provided to incorporate photo constructive and destructive interference patterns formed by the incident lights and the reflected lights respectively to identifying traces.

According to one of the embodiments, the main elements of the cursor control apparatus include a light-emitting unit rendering a light source. The light source is such as Laser with good spatial coherence. The apparatus has a housing disposing a light passage. The light passage is such as an opening on the housing. The light source emits lights out of the cursor control apparatus through this light passage. The cursor control apparatus includes a light-sensing unit which is composed of a plurality of sensor cells arranged in an array. The sensor array is used to receive incident lights reflected by an external object entering the apparatus through the light passage. The apparatus includes a control unit which is used to control energy made by the light-emitting unit while receiving the incident lights through the light passage. When computing the energy received by the every sensor cell within a time slot, an energy difference of spatial interference formed within the time slot is obtained. The energy difference is a basis to determine a moving direction of the external object.

In an exemplary embodiment, in addition to the sensor array has a plurality of sensor cells arranged in an array for sensing lights, the sensor array may be disposed with multiple dummy sensor cells. A fixed spacing is existed among the sensor cells which have uniform relative distances. The dummy sensor cell may be disposed around the sensor array. The control circuit may modulate the driving current of the light-emitting unit based on the energy acquired from the dummy sensor cell.

In the circuitry, the light-sensing unit includes a plurality of comparators. The every comparator is correspondingly connected with one sensor cell, and used to compare two input energy signals. The energy signal is related to the energy generated by the sensor cell, and the other one energy signal is a statistical average energy of effective energies generated by the plurality of sensor cells. An energy difference between the two input energy signals of spatial interference is formed within the time slot.

In an exemplary example, assembly of the light-sensing unit, the light-emitting unit, and the control unit may be packaged into one integrated circuit (IC).

Mechanically, the light passage on the housing of the apparatus is such as an opening. The opening is disposed opposite to a light source of the light-emitting unit. The opening allows emitting the lights out of the cursor control apparatus and receiving reflected lights through the opening. The opening on the apparatus is formed opposite to the direction to the user. The user's finger moves over the opening so as to control the movement of cursor. The mentioned sensor array within the apparatus is used to receive the incident lights reflected by the finger or any other external object. The reflected lights are received by the multiple sensor cells which are arranged in an array.

The cursor control apparatus includes one or more control interfaces and a processing circuit. The control interfaces are such as the function buttons or a wheel. The processing unit generates a control signal while the one or more control interfaces are clicked.

In the disclosure, the method for controlling the cursor control apparatus includes the light-emitting unit emitting lights firstly. The lights pass through the light passage on the housing. The light-sensing unit of the apparatus receives the lights reflected by the external object such as finger's skin through the light passage. The next step in the method is to measure the energy made by every sensor cell of the light-sensing unit within a time slot. An energy difference of the spatial interference formed within the time slot can be acquired. The energy differences are accumulated and measured within the time slot so as to determine a moving direction of the external object.

The light passage is such as an opening on the housing, and the opening is disposed opposite to a light source of the light-emitting unit. The opening allows emitting the lights out of the cursor control apparatus and receiving reflected lights there-through the opening.

In an exemplary embodiment, the sensor array is able to receive the lights reflected by the finger's skin while the user's finger moves over the opening of the housing. During this process, a control circuit is used to control the output optical energy made by the light-emitting unit. The control circuit dynamically adjusts an exposure time of the light-sensing unit, as well controls the operation of each sensor cell of the sensor array. In which, some dummy sensor cells are included in the sensor array. The optical energies made by these dummy sensor cells are referred to adjust driving current of the light-emitting unit, and to adjust the energy made by the whole light-emitting unit. The adjustment is related to controlling a gain of output of every sensor cell. The control unit may control emission cycle of the light-emitting unit by modulating duty cycle of a pulse-width modulation control signal.

In consequence, the movement of cursor with respect to the moving external object over the opening of the housing of the cursor control apparatus can be determined by acquiring the energy difference of the spatial interference formed within the time slot.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

Disclosure is related to a cursor control apparatus and its control method. The cursor control apparatus exemplarily includes a sensor array essentially composed of a plurality of sensor pixels arranged in an array. In one embodiment in the disclosure, the sensor array forms an optical sensing unit which is used to receive reflected lights from a surface and converts the light signals into the energy signals for used to determining movement. While the plurality of sensor pixels receive the lights, it may acquire constructive or destructive interference patterns from the energies of the reflected lights. The energy changes within a period of time may be calculated to determine a moving vector of the apparatus. The movement relative to the surface may be determined, especially to an optical indexer.

For example, while the cursor control apparatus is applied to controlling cursor's movement in a computer system, the mentioned external object is such as user's finger. The finger skin is with a rough surface. The lights reflected by the finger skin enter the cursor control apparatus, and the sensing cells receive the lights. Then the energies made by the multiple sensing cells are measured to render the interference patterns, and further obtain the energy difference made within the time slot. The any movement relative to the surface can be determined.

In particular, a coherent light or said the light with great spatial coherence is preferably applied as the light source. The coherent light allows the determination of the moving tracks to be more efficient. The determination may be cooperated with a scheme of sensitivity compensation that employs a movement recognition algorithm for light tracing. By which, the light tracing method can be applied to the various type of surfaces.

It is worth noting that a scheme of coherent light source package integration is introduced to the related cursor control apparatus according to one embodiment of the disclosed invention. The apparatus such as an optical indexer needs not to mount any additional optical lens or specific image sensor, for example the CMOS image sensor (CIS). The cursor control apparatus in accordance with the present invention needs no any disposal of optical components such as lens and reflectors along the light path. The reflected lights may be directly received by the optical sensing cells. The energy difference within a time interval is used to detect the movement of the external object.

The cursor control apparatus according to the disclosure preferably incorporates the light source with good spatial coherence, e.g. Laser. The apparatus having the array-formed sensor chip is operated with a light tracing algorithm.

Figure 2:
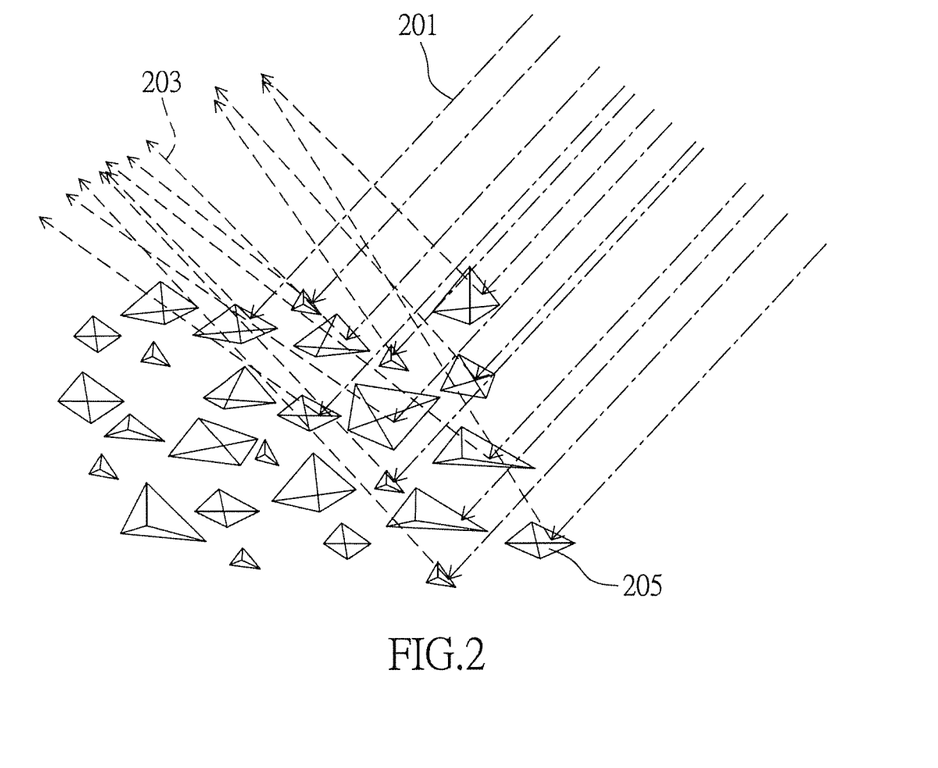
FIG. 2 shows a schematic diagram of an incident plane and the reflected light paths.

Reference is made to FIG. 2 depicting an incident light (20) made by a specific light source (not shown) emitted to a surface and then reflected (203). Therefore multiple reflected light paths expressed by the multiple lines are generated. The light source may utilize Laser, the coherent light. It is noted that the described coherent light may also be the light with great spatial coherence.

The shown multiple light paths involving the paths indicative of incident lights 201 emitted to a surface with surface structure 205, and the paths for reflected lights 203. Within a microscopic view of field, the surface structure 205 has irregular structure that causes the multi-directional reflected lights 203 as shown in the diagram.

The light source may continuously generate the incident lights 201 to the surface, and form the reflected lights 203. The reflected lights 203 are received by the sensor (not shown), in which the lights form the optical constructive and destructive interference patterns. It is particular that the light source is a coherent light source that generates the coherent incident light allowing enhancing the interference effect.

When the apparatus installed with the circuits embodying the mentioned light tracing method moves over an X-Y plane, the photo sensor receives the reflected lights 203. The apparatus samples the signals within a period of sampling time, and calculates average energy of the reflected lights. After that, an energy difference in different times or at different positions may be obtained. The sensor array apparatus according to the disclosure may preferably incorporate a sensor array that is used to obtain the energies at the different positions, and difference between the average energies. The moving track may therefore be determined. The calculation of the statistic average may include acquiring a statistic average from the energies received by all the sensor pixels; or the average is made by part of the sensor pixels. For example, the average is referred to the sensor pixels over a row such as the X direction shown in FIG. 7; or over a column such as the Y direction. The energy average may also be calculated from the energies received by the surrounding sensor pixels or centered pixels within a specific area.

In one of the embodiments incorporating the sensor array, the interference effect may be enhanced while the light source generates coherent light. It is noted that the coherent light introduces a very small phase delay within a wave envelope. The Laser is one type of the coherent lights rather than the non-coherent light such as sunlight or LED light.

To improve sensitivity of the optical sensor under the interface made by the reflected light, the coherent light is preferably introduced to the cursor control apparatus of the present invention. The coherent light may cause much small phase delay since it is featured to have less phase difference. To the spatial interference made by the non-coherent reflected light, the coherent Halt may cause comparative small phase delay. The coherent light may therefore advantage the spatial interference effect of the reflected light. The above-mentioned sensor array may calculate the difference of the spatial interference by the lights reflected from a surface.

Figure 3:
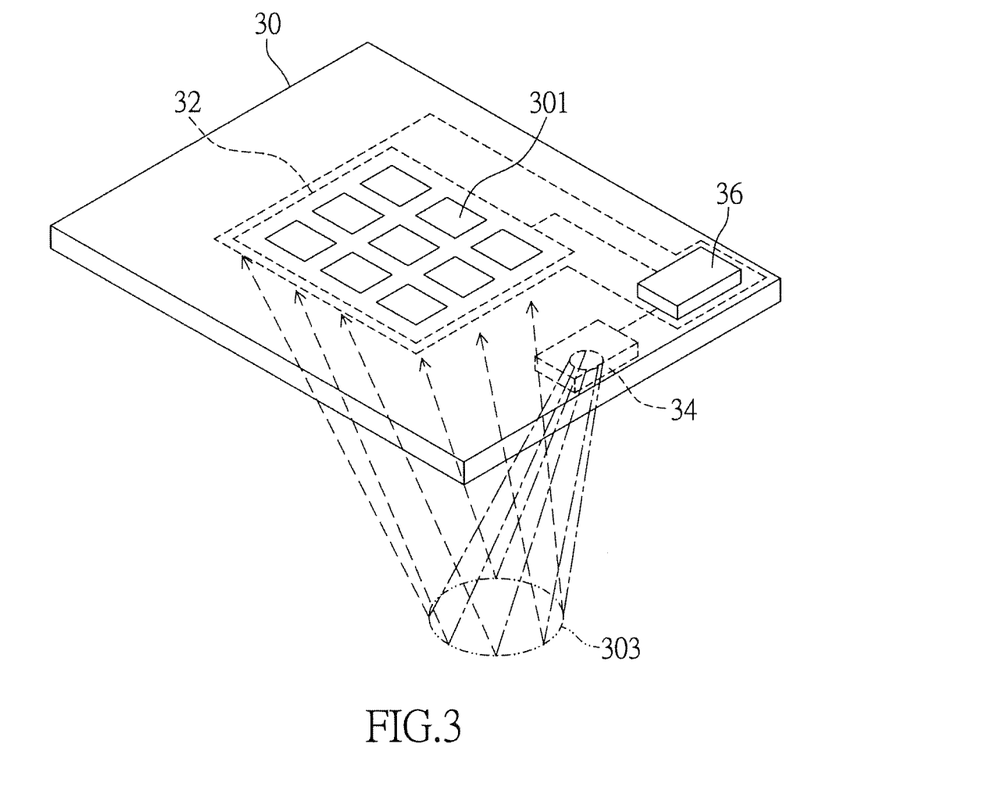
FIG. 3 shows a schematic diagram of a sensor array packaged in one integrated circuit of the cursor control apparatus in one embodiment of the present invention.

The sensor array such as the sensors shown in FIG. 3 describing the sensor array apparatus is packaged into one IC. According to one of the embodiments, the sensor array and the related controlling circuits are integrated into one semiconductor circuit. The mentioned light source, sensor array, and the controller may be packaged onto a circuit board within the cursor control apparatus. Therefore, there is no need to install any optical sampling element such as lens or specific semiconductor process such as CIS so as to advance photosensitive sensitivity.

A circuit board 30 shown in the figure is installed in one apparatus such as an optical computer mouse or a specific indexer. A sensor array 32 is mounted onto the circuit board 30 of the cursor control apparatus. The sensor array 32 includes a plurality of sensor pixels 301 arranged in an array. The sensor pixels 301 are integrated into an IC. In particular, the sensor array 32 and the controller 36 are integrated. In particular, the sensor pixels 301, especially the dummy sensor pixels shown in FIG. 7, of the sensor array 32 may be configured to have a fixed distance and an even relative position existed between two adjacent sensor pixels. The configuration allows the sensor array to receive the reflected lights evenly. The sensor pixels 301 of the sensor array 32 may evenly receive the reflected lights from their fixed positions. A light source 34 schematically emits lights onto a surface and forms the shown illuminated area 303. The lights reflected from the surface may then emit the sensor array 32. The every sensor pixel 301 receives the reflected light from different directions. A suitable photoelectric signal conversion may be applied to the signals received by the sensor pixels 301. The controller 36 and related circuit are used to measure the statistic average of the energy by firstly summing up the energies received by the sensor pixels 301. Next, the difference of the statistic average and the energy received by the every sensor pixel 301 can be obtained. The spatial interference difference made by the lights reflected from the surface can be obtained. The controller 36 may therefore determine the moving direction by accumulating multiple energy differences within a period of a sampling time.

About the spatial interference in the mentioned cursor control apparatus, especially, but not limited to, the coherent light source emits lights to the irregular surface structure of the surface and then generates the reflected lights with different directions. The optical interference is therefore produced. Interaction made between the incident lights and the reflected lights produces constructive or destructive interference patterns. The sensor array may acquire the spatial information from the interference patterns since the apparatus moves relative to the surface. The information associated to the movement over X-Y plane is therefore established.

In one embodiment, a Laser device may be introduced to be the light source of the cursor control apparatus adopted in a carrier such as the optical indexer. In a circuit board (30), the essential elements of the apparatus include a light source (34) that is used to generate an incident light emitted to a surface; a sensor array (32) including multiple sensor pixels (301) arranged in an array; a controller (36) coupled to the light source (34) and the sensor array (32), used to receive the light signals received by the sensor pixels (301). The energy state of every sensor pixel and the difference of the energy states within the period of sampling time can be acquired.

Figure 4A:
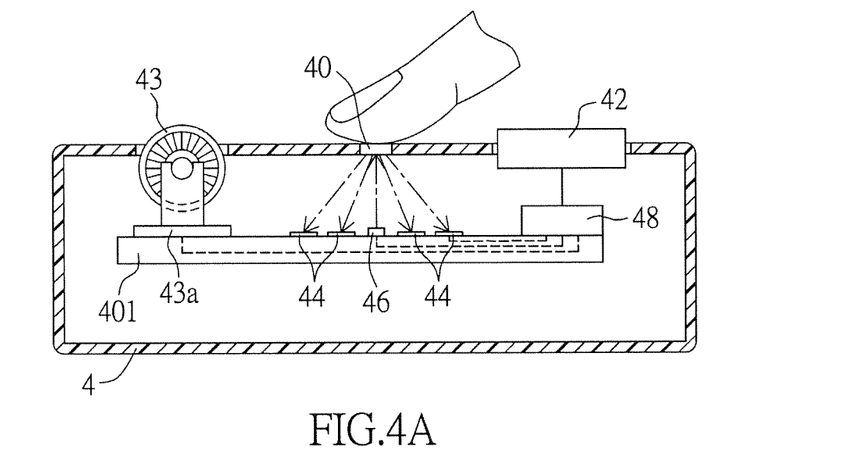
FIG. 4A shows a schematic diagram of the circuitry of the cursor control apparatus according to one embodiment of the present invention.

Reference is made to FIG. 4 showing circuit blocks describing the cursor control apparatus having the sensor array in an exemplary embodiment of the present invention. The apparatus 4 is covered with housing. A circuit board 401 is included, and on which the main circuit components are disposed. An opening is formed on the housing of the cursor control apparatus 4. The light passage is an opening that allows the light emitted out of the cursor control apparatus since it is disposed opposite to the position of inner light source. Through the opening, the cursor control apparatus again receives the reflected lights. After that, the array-formed sensor cells receive the reflected light. When the apparatus emits out of the apparatus 4, the reflected lights pass through the light passage 40.

According to the operation circumstance of the present example, the user may move his one of fingers over the opening (40) of the cursor control apparatus 4, for example sliding over the opening (40), rather than using the conventional computer mouse. Since the skin of finger is with a certain degree of rough surface, the lights reflected by the finger may develop interference phenomenon. The interference is a reference to determine the movement made by the finger because of its energy difference made within a time slot.

Some essential circuit units are disposed onto an inner circuit board 401 of the cursor control apparatus 4. For example, a control unit 48 is provided and electrically connected with the other circuit units. A light-emitting unit 46, electrically connected to the control unit 48, is disposed at the position opposite to a light passage 40, and therefore allowing emitting the lights out. The light-emitting unit 46 is preferably Laser which is as the light source with good spatial coherence. The control unit 48 may dynamically controls the photo energy emitted by the light-emitting unit 46. For example, the energy may be adjusted according to the feedback energy received by the sensor cells. The control unit 48 may adjust the emission cycle of the light-emitting unit 46 through pulse-width modulation.

According to one of the embodiments, the light source in the light-emitting unit 46 may be disposed at or around the center of the plurality of sensor cells arranged in an array. The reflected lights may be much evenly sensed by those sensor cells. The configuration of positions of the light passage 40 and the light source are preferably based on allowing the coherent light to enter or be reflected vertically.

A circuit board 401 is shown in the figure. The sensor cells arranged in an array constituting a sensor array 44 are disposed on the circuit board 401. The sensor array 44 is electrically connected with the control unit 48. The disposal of the sensor cells is referred to FIG. 7. The sensor cells also include many dummy sensor cells. The dummy sensor cells are preferably disposed around the sensor array 44. The energy received by those dummy sensor cells may not be adopted to determine the moving direction, but to be the reference for adjusting the output energy from the sensor cells. That is, the control unit 48 adjusts a driving current for the light-emitting unit 46 based on the energy made by the dummy sensor cells, so as to dynamically modulate the photo energy generated by the light-emitting unit 46.

In practice, the cursor associated with the cursor control apparatus 4 can be controlled by determining a moving direction of the finger or the other external object according to the interference of energies. The apparatus 4 may be disposed with software or hardware implemented control interface. The control interface is such as the one or more buttons 42 near the finger shown in the figure. The buttons 42 may not be limited to the hardware-implemented components, but also made by software which renders the buttons 42 formed on a panel. The circuits related to the buttons 42 are electrically connected with the control unit 48. The buttons 42 may be implemented as the function buttons of an optical indexer, for example the left button and the right button of a computer mouse.

In one further embodiment of the present invention, in addition to the aforementioned application disposed with the buttons, the apparatus 4 may have a conventional wheel 43, or other interface for rolling arrangement. For the wheel 43, an inner wheel control module 43a may be provided for processing the signals made by the wheel 43. The wheel control module 43a is electrically connected with the control unit 48 for generating a control signal. The control signal is then transmitted to the computer system associated with this cursor control apparatus 4.

Figure 4B:
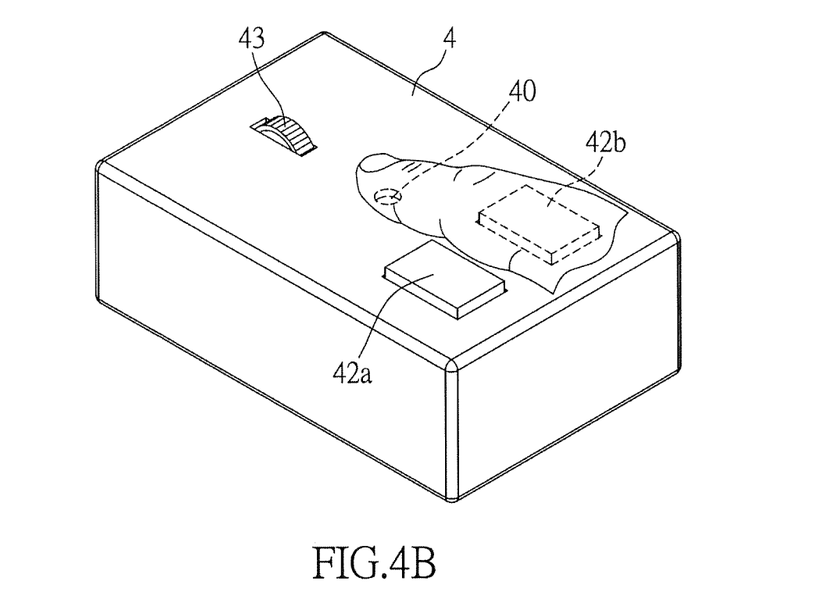
FIG. 4B shows a schematic diagram depicting exterior appearance of the cursor control apparatus according to one embodiment of the present invention.

FIG. 4B shows an exterior appearance of a cursor control apparatus according to one of the embodiments of the present invention. The cursor control apparatus 4 has an opening 40 disposed upon the housing. The opening 40 is a passage allowing the light to pass. When the finger touches and moves over the opening 40, a tiny movement is able to control the cursor. It is worth noting that the position of opening 40 may be changed according to practical need. For example, since the opening 40 is disposed upon the top cap of the apparatus, the user may use his finger to move over the opening 40 to manipulate the cursor. If the opening 40 is disposed at the left or right side of the apparatus, the user's thumb may be moved over the side opening for operation. Furthermore, the number of the openings 40 and the related modules including the light-emitting components and sensors may increase for various needs.

The embodiment appears the function buttons 42a and 42b operate as the left and right buttons of the computer mouse. A wheel 43 may also be disposed for assisting the operation. The various control interfaces may be arranged according to the practical needs.

Figure 5:
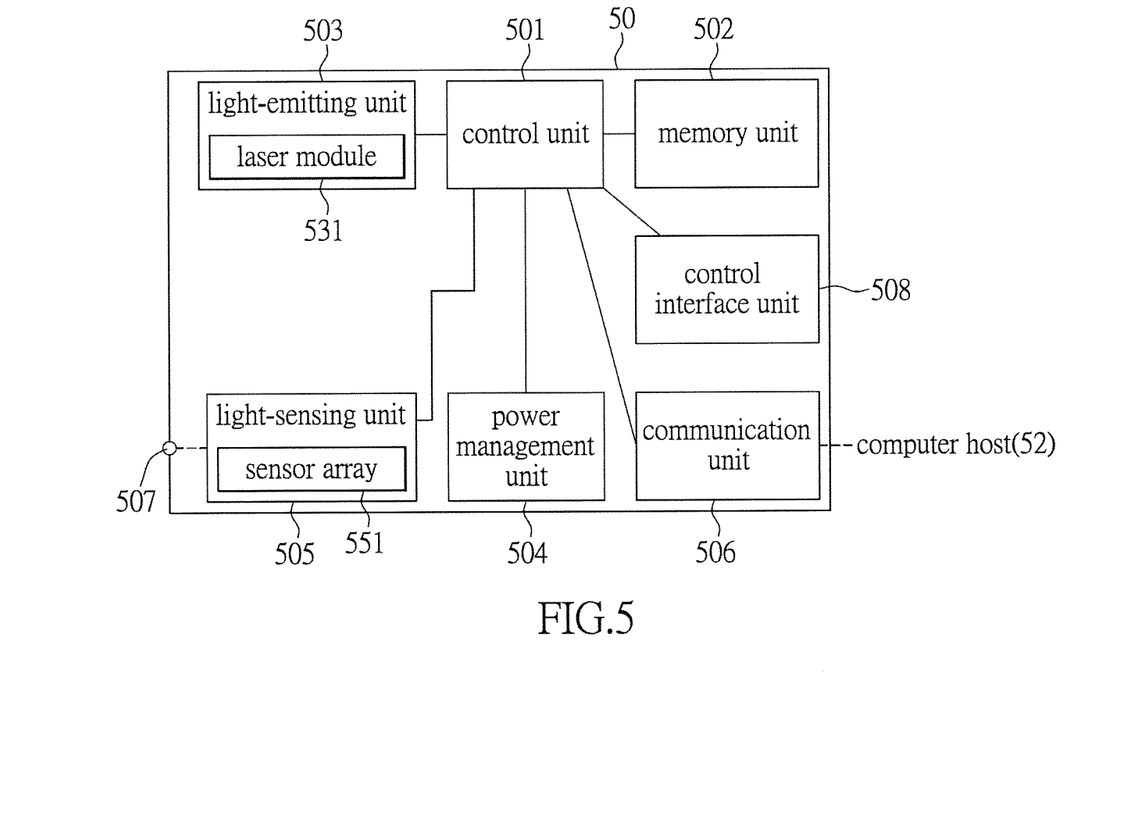
FIG. 5 shows a schematic diagram depicting circuit blocks describing the cursor control apparatus according to one embodiment of the present invention.

Reference is made to FIG. 5, which depicts a circuit block diagram of the cursor control apparatus in one embodiment of the present invention.

The diagram shows the major circuit units for operating the cursor control apparatus 50. A control unit 501 is such as a core circuit for processing the signals made by the circuit units. The control unit 501 is an essential circuit for the apparatus to perform numerical computation and movement determination. The control unit 501 is also in charge of retrieving the signals made by the circuit units, and accordingly performing the necessary computation. The computing job may be executed by the control unit 501 or by a specific micro-processing circuit.

The main circuit components electrically connected with the control unit 501 are such as, as shown in the figure, a memory unit 502, a light-emitting unit 503 having a laser module 531, a power management unit 504, a light-sensing unit 505 having a sensor array 551, and a communication unit 506. These components may be increased, reduced or merged as demands.

An opening 507 is particularly disposed upon the housing of the cursor control apparatus 50, rather than the conventional optical indexers in need of optical lens or/and reflectors. This opening 507 is merely a mechanical design allowing the external object to touch thereon. The position of opening 507 is preferably opposite to the position of light source of the internal light-emitting unit 503. The opening 507 allows the lights emitting out of the cursor control apparatus 50, and then receiving the reflected lights. The arrayed sensor cells therefore evenly receive the reflected lights.

The memory unit 502 is such as the memory for buffering the signals made by the cursor control apparatus 50, including storing the requisite firmware or software. The light-emitting unit 503 includes the laser module 531 or any other light source, and can be controlled by the control unit 501. The control unit 501 is able to adjust the photo energy feedback by referring information provided by the light-sensing unit 505 dynamically.

The light-sensing unit 505 includes a sensor array 551. To refer to the embodiments described in the FIGS. 3, 6, and 7, the sensor array 551 is composed of a plurality of sensor cells arranged in an array. Those sensor cells may simultaneously receive the reflected lights. Accordingly the received energy may be calculated based on the signals made by the cells. The energy difference within a time slot is incorporated to determining the moving direction.

One of the embodiments to implement cursor control apparatus 50 is such as a peripheral device connected with a computer host 52. For example, the communication unit 506 conducts the interconnection between the apparatus 50 and the computer host 52. The wired USB or the wireless means such as radio, wireless network, or Bluetooth™ may embody the communication. The communication unit 506 is used to perform signal codec capable of encoding and decoding data between the host 52 and the apparatus 50.

The cursor control apparatus 50 may simultaneously take power from the computer host 52, for example over USB. The apparatus 50 may also have its own power supply, for example battery. The power management unit 504 is used to manage the electricity in the apparatus 50.

As described in the foregoing embodiments, the cursor control apparatus 50 may be equipped with a control interface, for example one or more function buttons and/or a wheel. The apparatus 50 has the control interface unit 508 used to process the signals made by the control interface. The control interface unit 508 is electrically connected with the control unit 501. For example the control signals may be made by touching the control interface. The control signals are the reference to render the cursor movement for manipulating the computer host 52.

Figure 6:
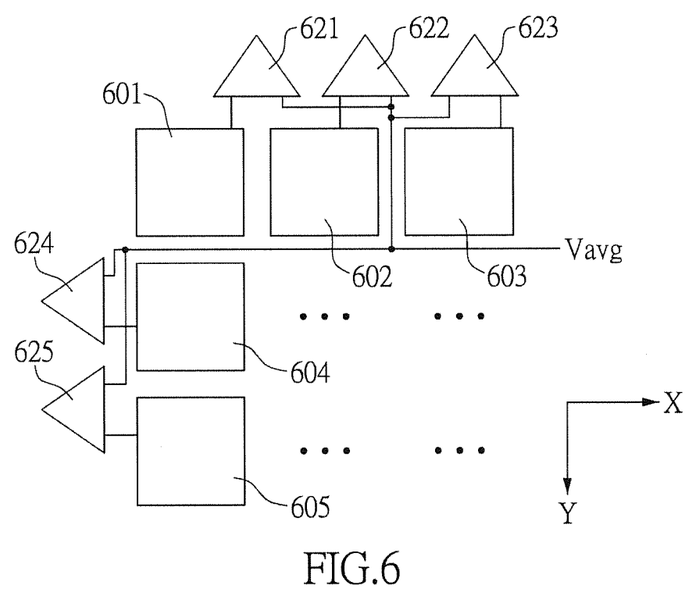
FIG. 6 shows a schematic diagram of the sensor array adopted by the apparatus in one embodiment of the present invention.

Reference is now made to FIG. 6 describing calculating a distribution of the energies received by the sensor array of the cursor control apparatus.

Further, FIG. 6 schematically shows a layout of the sensor array. A plurality of sensor pixels are arranged over an X-Y plane to form an "N×M" sensor array. It is noted that the geometric shape of the sensor array may be, but not limited to, symmetric rectangle, square, circle, or oval-shaped. The sensor pixels 601, 602, 603, 604, and 605 are arranged in an array respectively along X and Y directions. It is noted that the practical number of the pixels is not limited to the figure. The circuit board with these sensor pixels 601, 602, 603, 604, and 605 further includes other elements such as the comparators 621, 622, 623, 624, and 625. The every comparator correspondingly associates with a sensor pixel. The input value is the average voltage signal Vavg generated by the every sensor pixel. This average voltage signal Vavg is compared with voltage signal generated by the sensor pixel as receiving the light. The comparison results in the high or low voltage value. At last, it is featured to determine the moving direction by acquiring the comparisons of the two adjacent sensors in the tracing method.

Figure 8:
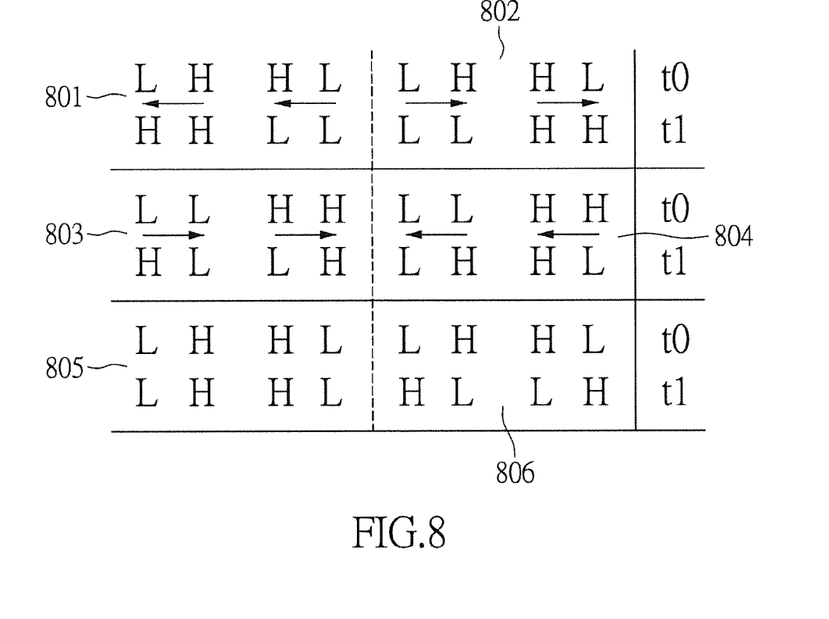
FIG. 8 shows an exemplary diagram describing the method of light tracing in the sensor pixels in one embodiment of the present invention.

In the diagram, the shown comparator 621 is coupled to the sensor pixel 601. An input signal is such as the energy signal generated by the sensor pixel 601. The signal may be indicated by a voltage signal. The other input end shows an average voltage signal Vavg. The comparator 621 is used to compare the two inputs, and output a comparison result. In one embodiment, a binary characteristic value (H/L) is used to indicate this comparison result. The high and low voltage signals are respectively expressed by the characters H and L that as shown in FIG. 8.

According to one of the embodiments, the light tracing method applied to the cursor control apparatus is featured that an energy distribution over a plane is formed by depicting the constructive and destructive interference patterns of the reflected coherent lights. The change of the energy distribution at different times may be used to determine a moving vector. In an exemplary embodiment, a scheme of non-relative viewpoints is introduced to performing movement judgment. The scheme incorporates the energy information of the surrounding sensor pixels of the sensor chip to be compared with the average energy, so as to determine a moving direction. It is noted that, rather than the general method for determining the moving vector by the information extracted from the sensor pixels.

To the cursor control, in one layout of the sensor chip of an exemplary embodiment, the sensor chip includes the sensor pixels arranged in an array. The sensor pixels may include some inactive sensor pixels, said dummy sensor pixels, disposed around the chip. The centered sensor pixels are the active area to receive the lights. Therefore, while the control circuit or the related calculation circuit receives the energy signals from the sensor chip, only the energies made by the non-dummy sensor pixels are adopted to perform the calculation and further application. It is noted that those dummy sensor cells would not provide the energy signals for determining the movement vector, but for verifying the light signals. Reference is made to the layout of the sensor pixels shown in FIG. 7.

Figure 7:
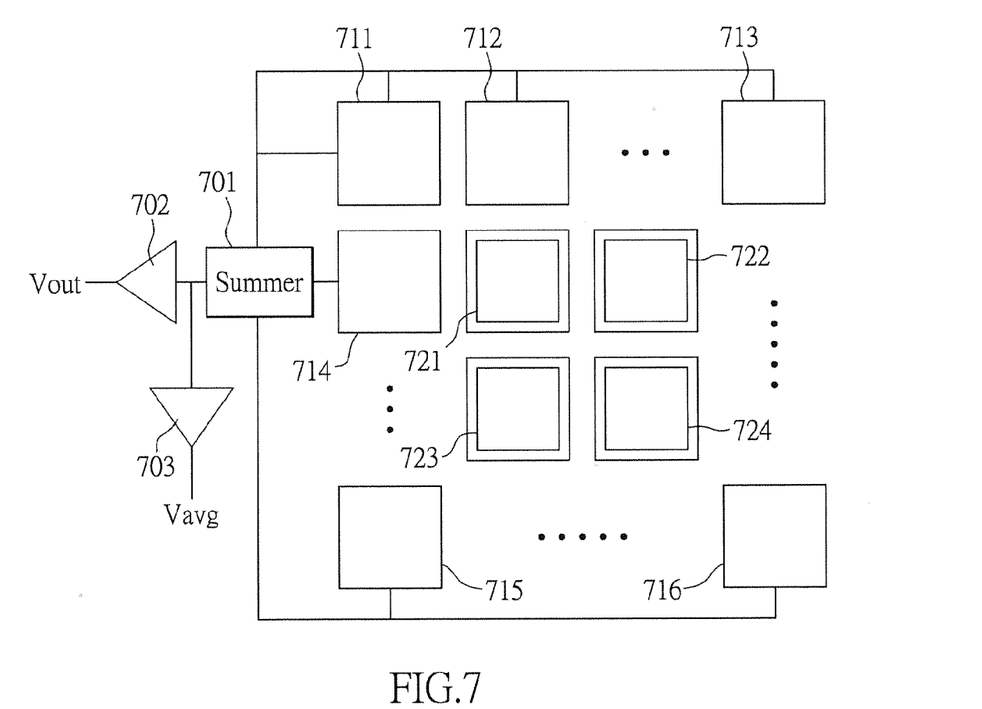
FIG. 7 schematically shows a layout of the sensor pixels arranged in an cursor control apparatus of the present invention.

The array-formed sensor pixels include some dummy sensors at surrounding area and the centered pixels. One major purpose of the disposal of the dummy sensors is to even the whole sensor chip in the manufacturing process. The energies are also received evenly by the sensor chip. In the diagram of the embodiment, the surrounding the chip are configured to be the inactive dummy sensor pixels 711, 712, 713, 714, 715, and 716. The sensor pixels 721, 722, 723, and 724 near the central area are the major portion to receive the signals.

When the sensor pixels are simultaneously exposed under the reflected lights, the centered pixels may evenly sense the photo signals. The surrounding sensor pixels may possibly receive uneven energies. The unstable or uncertain energies made by the dummy sensor pixels (711, 712, 713, 714, 715, 716) may be excluded while the total energy of the sensor chip is calculated. Therefore, this scheme allows the apparatus to acquire reference energy with better referral value.

As the diagram shows, a summation component 701, electrically connected with the every sensor pixel of the sensor chip, is provided in the circuit. The summation component 701 is able to receive the photocurrent from the every sensor pixel, and perform analog-to-digital conversion thereon. In which, a gain amplification process may be introduced to efficiently receiving the reference value since the photocurrent received by the every sensor pixel is tiny. The energy change within the period of time may be obtained from the amplified energies. After that, an output signal is formed when the photocurrents made by the sensor pixels are processed by the gain amplifier 702. The output is likely represented by an output voltage Vout. Through a calculator 703, an average energy can be obtained from the available received energies and outputted. The output is such as the average voltage signal Vavg.

The above-mentioned output signals such as the output voltage Vout and the average voltage signal Vavg are outputted to the comparator, e.g. comparator 621 of FIG. 6. The comparator compares the energy signal made by the every sensor pixel and a reference value such as the average energy from all or part of the sensor pixels. Therefore, an energy state for the sensor pixel is defined. For example, the energy state of every sensor pixel may be represented by a binary characteristic value "H" abbreviated from high or "L" abbreviated from low.

Figure 10:
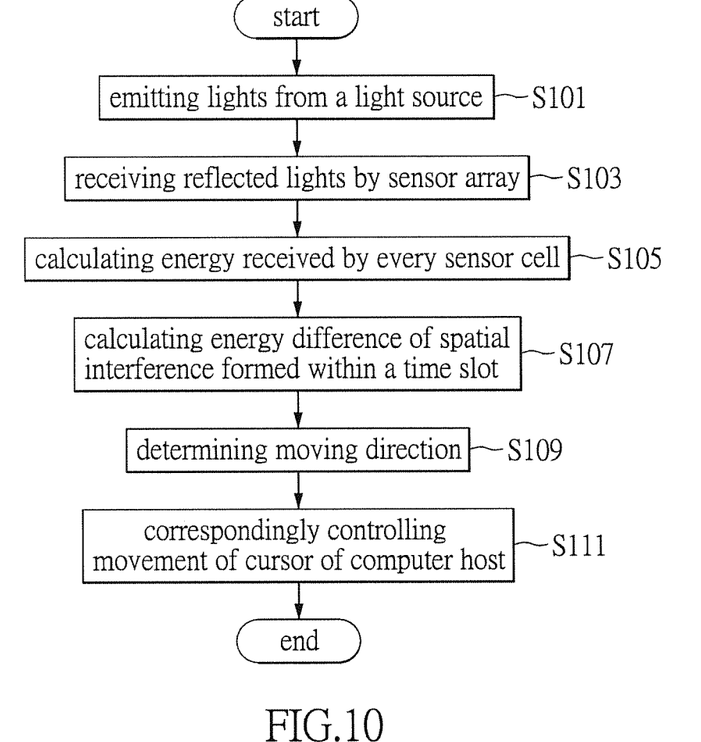
FIG. 10 shows a flow chart illustrating the method for controlling cursor according to one embodiment of the present invention.

The method for controlling cursor in an exemplary embodiment may be referred to the flow chart shown in FIG. 10.

In the beginning, such as step S101, the lights made by the light source of the cursor control apparatus may pass through the light passage such as the opening. When the lights emit to the surface of external object, for example the finger's skin, the reflected lights may then enter the cursor control apparatus through the light passage. Such as step S103, the sensor array, especially the arrayed sensor cells, receives the reflected lights. Next, in step S105, a computation mechanism is incorporated to the apparatus for computing the energy received by every sensor cell within the sensor array. The energy made within a time slot may therefore be obtained. A difference of energy value between the cells is then computed, such as step S107. By accumulating the differences made by the arrayed sensor cells within this time slot, an energy difference forming spatial interference is obtained. The energy difference is incorporated to determining the object's movement, such as step S109. The movement of the external object is interpreted as a cursor's movement for manipulating the computer host, such as S111.

In the operation of determining the cursor movement, the control unit is used to dynamically adjust the energy generated by the light-emitting unit based on the information related to the energy. For example, the driving current of the light-emitting unit may be controlled for adjusting the output energy. Further, the exposure time for receiving the incident lights for every sensor cell of the light-sensing unit may also be controlled. A gain of the output energy is also an adjustable factor. The photo energy received by the every sensor cell within a time slot may be acquired. Accordingly, the scheme using the mentioned sensor array allows the cursor control apparatus to adapt to the various conditions of surfaces as introducing a compensation mechanism made by the adjustable intensity and brightness of the light source with the adjustable exposure time. The various conditions of the surfaces exemplarily indicate the various surface structures and a distance between the surface and the cursor control apparatus.

Figure 9:
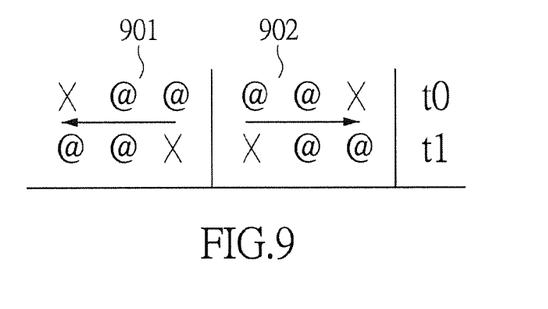
FIG. 9 shows another exemplary diagram describing the method of light tracing in the sensor pixels in another embodiment of the present invention.

The method to determine the moving direction by computing the change of energies within a specific time interval of every sensor cell may be referred to the schematic diagram in FIGS. 8 and 9. One of the ways to compute the change of energy made by the sensor cell is to dispose a comparator to compare the received energies and the statistic energy value. The spatial interference within the time slot is accordingly formed.

The determination of the moving vector made by the binary characteristic value (H/L) may be referred to the light tracing method exemplarily described in FIG. 8.

The exemplary diagram shows a plurality of sensor pixel groups 801, 802, 803, 804, 805, and 806 arranged in an array. It schematically shows the energy change between the adjacent sensor pixels at different times, e.g. first time t0 and second time t1. The energy change is used to determine the moving vector.

In FIG. 8, the time labels "t0" and "t1" represent the two sampling times. The labels "H" and "L" respectively represent the high and low voltage signals outputted by the comparator. The labels "H" and "L" indicate the two types of energy states since two energies at two moments are compared with an average. This energy state indicated of an energy change may be expressed by the binary characteristic value (H/L). The voltage signals at the different times show a transition of the movement so as to determine the overall moving vector.

For example, a sensor pixel group 801 includes several sensor pixels at different energy states. It is shown at the left side of the diagram that the two sensor pixels are in different states at the first time t0, and exemplarily the sensor pixels respectively senses two states "L" and "H" (from left to right). The energy states "L,H" at the first time t0 are then transformed to the energy states "H,H" at the second time t1. It means the energy states of the two sensor pixels are transformed to the states "H,H" at the next moment. In which, it is determined that the energy state "L(t0)" of one of the sensor pixels is transformed to state "H(t1)", and it appears that the energy state "H" at the right position shifts to left position at the next moment. Therefore, in accordance with the present invention, it determines that the effective moving direction is from right to left within this sampling time.

Further, the energy states of another pair of sensor pixels in this sensor pixel group 801 are "H,L" at the first time t0; Next, at the second time t1, the energy states are transformed to next states "L,L". In which, the energy state of one of the sensor pixels is from state "H" to state "L". It appears that the energy state "L" at the right position shifts to left position. It therefore shows the effective moving direction is from right to left.

Next, within the sensor pixel group 802, the energy states "L,H" of the left two sensor pixels at the first time t0 are transformed to states "L,L" at the second time t1. It shows the energy state "H" at the right position is replaced by the state "L" originally at left position. It therefore determined that the moving vector indicative of a direction from left to right.

Similarly, the energy states of the right two sensor pixels in the sensor pixel group 802 are "H,L" at the first time t0. At the second time t1, the energy states are transformed to next states "H,H". It shows the state "L" at the right position is replaced with the state "H" at the left position. It also determines that the moving vector indicative of the direction from left to right.

Further, there is no any arrow shown for the sensor pixel groups 805 and 806 after the determination shows there is no energy change therein. In which, the energy states for the sensor pixels are not changed from the first time t0 to the second time t1; or the change may not be qualified to determine any movement. For example, it is not able to determine the moving direction by this change since the energy states of the pixels in the sensor pixel group 806 are "L,H" at the first time t0, and be transformed to "H,L" at the second time t1. Therefore, the sensor pixel group 806 does not output any effective signal.

It consequently determines an overall moving vector by integrating all the obtained moving vectors when all the energy changes of all the sensor pixels are completely determined within the period of sampling time.

One further embodiment for determining the movement may be referred to FIG. 9. FIG. 9 shows a schematic diagram depicting the method of light tracing.

The shown aspect for recognizing the moving vector is based on the transformation of the energy states of the sensor pixels at different times. The label "X" indicates meaningless value; and label "@" shows the available sensing signal be found between the times t0 and t1. The aspect utilizes the change among the labels to determine the moving vector.

The signal energies received by the multiple sensor pixels in the sensor chip can be compared with an average at the different times while the sensor chip receives the reflected light. The comparison results in high or low voltage signal. For example, the label "@" shown in the diagram represents the available voltage signal. In some conditions, it is labeled as "X" when no energy change or no meaningful voltage signal fluctuation can be found.

In the embodiment shown in FIG. 9, in the sensor pixel group 901, the label "X@@" shows the comparator found the energy change among the adjacent sensor pixels at the first time t0. At the second time t1, the energy change made to the sensor pixels are labeled as "@@X". When the energy state "X@@" at the first time t0 are transformed to the state "@@X" at the second time t1, it appears that the label "@@" are shifted to left position. It is therefore a leftward shift in the sensor pixel group 901 determined, as the arrow shows in the diagram.

Further, in the sensor pixel group 902, the energy state of the adjacent sensor pixels is "@@X" showing the energy change occurred at the first time t0; and the energy state is "X@@" at the second time t1. The transformation is made between the times t0 and t1, and it shows the label "@@" is rightward shifted. The method of light tracing may therefore adopt this scheme to determine the overall movement within a period of time.

It is worth noting that any tiny error made to the sensor array incorporated in the apparatus of the present invention may not influence correct determination of the movement. When the light tracing method is applied to an optical computer mouse, the slow change of the reference signals may not influence the overall determination because the shifting rate as manipulating the mouse is far lower than the processing rate of the control circuit within the apparatus.

To sum up the above description, disclosure is related to the cursor control apparatus, and with sensor components and light source that are integrated into one semiconductor package. The integration effectively reduces the intrinsic noise inside the apparatus. A compensation mechanism is further provided to dynamically adjust the intensity or brightness of the light source, and adjust the exposure time accordingly. This compensation mechanism allows the cursor control apparatus to adapt to various types of surfaces. Under this scheme, the cursor control apparatus needs neither additional optical lens nor specific image sensor such as CMOS image sensor (CIS). It is noted that the sensor cells of the cursor control apparatus directly receive the reflected lights without any intermediate optical components; particularly the energy difference within a time interval is used to detect the movement of the external object.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A cursor control apparatus, comprising:
   a light-emitting unit, rendering a light source;
   a housing with a light passage, wherein the light source emits lights out of the cursor control apparatus through the light passage, wherein the light passage is an opening on the housing, and the opening is toward a user and allowing the user's finger to move over the opening for controlling cursor; the opening allows lights emitted out of the cursor control apparatus without lens, and receive lights reflected back from the finger to the cursor control apparatus and received by a plurality of arrayed sensor cells;
   a light-sensing unit, comprising:
   a sensor array having the plurality of sensor cells arranged in an array, used to receive the lights entering the cursor control apparatus through the light passage;
   a plurality of comparators, wherein every comparator is correspondingly connected with one sensor cell, and used to compare two input energy signals, in which one energy signal is related to the energy generated by the sensor cell, and the other one energy signal is a statistical average energy of effective energies generated by all or part of sensor cells; an energy difference between the two input energy signals formed within a time slot is used to determine a moving vector; wherein the energy difference defines an energy state for every sensor cell such that two types of energy states expressed by binary characteristic values; and
   a control unit, electrically connected with the light-emitting unit and the light-sensing unit, used to control energy supplied to the light-emitting unit, and control the light-sensing unit to receive incident lights through the light passage; wherein, the energy difference of spatial interference formed within the time slot by calculating energy received by every sensor cell within the time slot.

2. The apparatus according to claim 1, wherein the sensor array having the plurality of arrayed sensor cells includes multiple dummy sensor cells, and the sensor array is used to receive the incident lights reflected from a surface through the light passage.

3. The apparatus according to claim 2, wherein, a fixed spacing is existed among the sensor cells which have uniform relative distances.

4. The apparatus according to claim 3, wherein the dummy sensor cells are disposed around the sensor array.

5. The apparatus according to claim 1, wherein the light-sensing unit, the light-emitting unit, and the control unit are packaged into one integrated circuit.

6. The apparatus according to claim 1, further comprising one or more control interfaces and a control interface unit, wherein the control interface unit is electrically connected with the control unit and allowing generating control signals when touching the one or more control interfaces.

7. The apparatus according to claim 6, wherein the one or more control interfaces are one or more buttons or/and a wheel disposed on the housing.

8. The apparatus according to claim 1, wherein the light source is Laser which has great spatial coherence.

9. A control method of a cursor control apparatus having a housing with a light passage being an opening toward a user allowing lights emitted out of the cursor control apparatus without lens, and receiving the lights reflected back from an external object moving over the opening to the cursor control apparatus, comprising:

a light-emitting unit emitting lights out of the cursor control apparatus through the light passage on the housing of the apparatus;

a light-sensing unit receiving lights reflected by the external object through the light passage, wherein the light-sensing unit includes a plurality of sensor cells arranged in an array, a plurality of comparators, and each comparator correspondingly connects to one sensor cell for comparing energy made by the sensor cell and a statistical average energy averaged from energies made by all or part of the plurality of sensor cells, so as to calculate an energy difference for every sensor cell of spatial interference formed within a time slot;

calculating optical energy of each sensor cell within the time slot;

obtaining the energy difference of spatial interference formed within the time slot; and determining moving direction of the external object in accordance with an accumulation of energy differences within the time slot, wherein the external object's movement over the opening toward the user with respect with a cursor movement is determined in accordance with the accumulation of energy differences within the time slot;

wherein the energy difference defines an energy state for every sensor cell such that two types of energy states expressed by binary characteristic values.

10. The method of claim 9, wherein the light passage is an opening on the housing, and the opening is disposed opposite to a light source of the light-emitting unit, allowing emitting the lights out of the cursor control apparatus and receiving reflected lights through the opening.

11. The method of claim 9, wherein the optical energy made by the light-emitting unit is dynamically controlled by a control unit of the cursor control apparatus.

12. The method of claim 11, wherein the sensor cells includes multiple dummy sensor cells; the control unit adjusts a driving current of the light-emitting unit according to optical energy received by the dummy sensor cells; and the control unit controls emission cycle of the light-emitting unit by modulating duty cycle of a pulse-width modulation control signal.

13. The method of claim 9, wherein the control unit controls the light-sensing unit to receive incident lights through the light passage, including dynamically adjusting an exposure time of the light-sensing unit.

14. The method of claim 13, wherein the control unit dynamically adjusts a gain to output energies of the sensor cells.

15. The method of claim 14, wherein the control unit controls the gain to the every sensor cell according to a feedback signal from a sensor array composing the multiple sensor cells.

* * * * *